United States Patent
Glasgow et al.

(10) Patent No.: US 7,407,219 B2
(45) Date of Patent: Aug. 5, 2008

(54) ENERGY MANAGEMENT BEAM

(75) Inventors: Scott C. Glasgow, Spring Lake, MI (US); David W. Heatherington, Spring Lake, MI (US); Bruce W. Lyons, Grand Haven, MI (US)

(73) Assignee: Shape Corporation, Grand Haven, MI (US)

( * ) Notice: Subject to any disclaimer, the term of this patent is extended or adjusted under 35 U.S.C. 154(b) by 678 days.

(21) Appl. No.: 10/808,127

(22) Filed: Mar. 24, 2004

(65) Prior Publication Data

US 2005/0213478 A1    Sep. 29, 2005

(51) Int. Cl.
*B60R 19/04*    (2006.01)
*B60R 19/18*    (2006.01)

(52) U.S. Cl. ............... 296/187.03; 293/120; 293/122; 293/133

(58) Field of Classification Search ......... 293/120–122, 293/132, 133; 296/187.03, 187.09
See application file for complete search history.

(56) References Cited

U.S. PATENT DOCUMENTS

| | | | |
|---|---|---|---|
| 3,997,208 A | 12/1976 | Nomiyama | |
| 4,116,480 A | 9/1978 | Crestetto | |
| 4,408,790 A | 10/1983 | Shimoda et al. | |
| 5,293,973 A | 3/1994 | Thum | |
| 6,179,355 B1 | 1/2001 | Chou et al. | |
| 6,352,297 B1 * | 3/2002 | Sundgren et al. | 293/102 |
| 6,540,276 B2 | 4/2003 | Azuchi et al. | |
| 6,554,333 B2 * | 4/2003 | Shimotsu et al. | 293/132 |
| 6,726,261 B2 * | 4/2004 | Goto et al. | 293/120 |
| 6,802,548 B2 * | 10/2004 | Shimotsu | 293/133 |
| 6,942,262 B2 * | 9/2005 | Glasgow et al. | 293/132 |
| 6,971,691 B1 * | 12/2005 | Heatherington et al. | 293/102 |
| 6,986,536 B1 * | 1/2006 | Heatherington et al. | 293/102 |
| 7,044,515 B2 * | 5/2006 | Mooijman et al. | 293/120 |
| 7,108,303 B2 * | 9/2006 | Bladow et al. | 293/122 |
| 2005/0082853 A1 * | 4/2005 | Wallman | 293/133 |
| 2006/0028032 A1 * | 2/2006 | Henseleit | 293/102 |

\* cited by examiner

*Primary Examiner*—Dennis H. Pedder
*Assistant Examiner*—Greg Blankenship
(74) *Attorney, Agent, or Firm*—Price, Heneveld, Cooper, DeWitt & Litton, LLP

(57) ABSTRACT

An energy management system comprising a longitudinally extending beam including a first beam portion and a second beam portion. A first one of the first beam portion and the second beam portion has a first face, a first side wall and a second side wall. A second one of the first beam portion and the second beam portion has a second face. The first side wall has a first U-shaped section spaced from the first face and the second side wall has a second U-shaped section spaced from the first face. The first side wall rolls to enlarge the first U-shaped section and the second side wall rolls to enlarge the second U-shaped section during an impact force directed against the first face of the first beam portion or the second face of the second beam portion.

63 Claims, 9 Drawing Sheets

ENERGY MANAGEMENT BEAM

BACKGROUND OF THE INVENTION

The present invention relates to a beam design that absorbs energy efficiently while deforming. Applications for this invention could include vehicle bumper systems, side impact bars, and sill plates.

Modern impact beams are designed to absorb a maximum of impact energy over a given stroke. At the same time, they are designed to minimize load spikes, and to distribute energy in a manner promoting uniform and predictable collapse upon undergoing loading from impact. Every millimeter of space is important to energy absorption. Further, the individual components of an energy absorbing system must combine well with other energy absorbing components.

Accordingly, an energy management beam which maximizes the aforementioned desired features has long been desired.

SUMMARY OF THE PRESENT INVENTION

A first aspect of the present invention is to provide an energy management system comprising a longitudinally extending beam having a front face, a first side wall and a second side wall. The first side wall has a first U-shaped section spaced from the front face and the second side wall has a second U-shaped section spaced from the front face. The first side wall rolls to enlarge the first U-shaped section and the second side wall rolls to enlarge the second U-shaped section during an impact force directed against the front face of the beam.

Another aspect of the present invention is to provide an energy management system comprising a longitudinally extending beam having a front face, a first side wall and a second side wall, an energy absorber located adjacent the front face of the beam, and mounts engaging a rear of the beam for connecting the beam to a vehicle. The first side wall has a first U-shaped section spaced from the front face and the second side wall has a second U-shaped section spaced from the front face. The first side wall rolls to enlarge the first U-shaped section and the second side wall rolls to enlarge the second U-shaped section during an impact force directed against the front face of the beam.

Yet another aspect of the present invention is to provide an energy management system comprising a longitudinally extending beam including a first beam portion and a second beam portion. A first one of the first beam portion and the second beam portion has a first face, a first side wall and a second side wall. A second one of the first beam portion and the second beam portion has a second face. The first side wall has a first U-shaped section spaced from the first face and the second side wall has a second U-shaped section spaced from the first face. The first side wall rolls to enlarge the first U-shaped section and the second side wall rolls to enlarge the second U-shaped section during an impact force directed against the first face of the first beam portion or the second face of the second beam portion.

These and other aspects, objects, and features of the present invention will be understood and appreciated by those skilled in the art upon studying the following specification, claims, and appended drawings.

BRIEF DESCRIPTION OF THE DRAWINGS

The following brief description of the figures, and the related figures themselves, exemplifies a particular preferred embodiment of the invention constituting the best mode presently contemplated. As will be understood, other embodiments of the invention as well as changes and variations in the particular structure shown in these figures are no doubt possible, and may very well suggest themselves to those skilled in the art after studying this disclosure and these figures.

DETAILED DESCRIPTION OF PREFERRED EMBODIMENT

Figure 1:
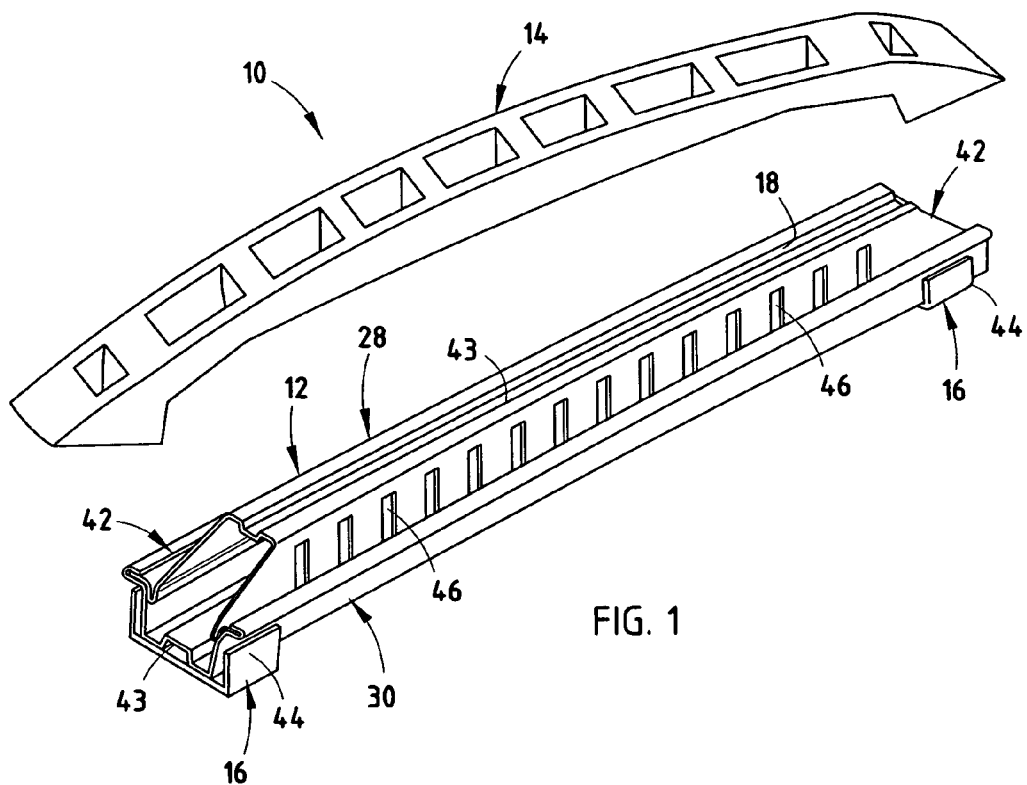
FIG. 1 is an exploded perspective view of a bumper system in accordance with the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts generally defined in the appended claims. Hence, specific physical details and characteristics present in the embodiments disclosed herein are not to be considered as limiting, unless expressly stated otherwise.

The reference number 10 (FIG. 1) generally designates an energy management system embodying the present invention. In the illustrated example, the energy management system 10 includes a longitudinally extending beam 12 having a front face 18, a first side wall 20 and a second side wall 22. The first side wall 20 has a first U-shaped section 24 spaced from the front face 18. The second side wall 22 has a second U-shaped section 26 spaced from the front face 18. The first side wall 20 rolls to enlarge the first U-shaped section 24 and the second side wall 22 rolls to enlarge the second U-shaped section 26 during an impact force directed against the front face 18 of the beam 12, thereby absorbing energy from the impact. In the illustrated example, the energy management system 10 is used in an energy management bumper system, with the energy management bumper system including an energy absorber 14 located adjacent a front of the beam 12 and mounts 16 engaging a rear of the beam 12 for connecting the beam 12 to a vehicle. However, it is contemplated that the energy management system 10 could be used as a side impact beam in a vehicle or anywhere in any object that is impacted and it is desirable to absorb energy from the impact.

In the illustrated example, the energy absorber 14 helps absorb energy and distributes stress across the beam 12 during the impact force directed against the front face 18 of the beam 12. An example of the energy absorber 14 that can be used in the bumper system 10 is disclosed in U.S. Pat. No. 6,672,635, the entire contents of which are hereby incorporated herein by reference. However, it is contemplated that any energy absorber can be used in the present invention and such energy absorbers are well known to those skilled in the art. Fascia (not shown) is typically placed over the energy absorber 14 to provide for curvature and aesthetics.

The illustrated longitudinally extending beam 12 (FIG. 2) is a two piece beam and includes a front beam portion 28 and a rear beam portion 30. The front face 18, the first side wall 20 and the second side wall 22 are on the front beam portion 28. The rear beam portion 30 is substantially U-shaped and includes a base 32, a first side leg 34 and a second side leg 36. The front beam portion 28 includes a first pair of side flanges 38 extending outwardly from the ends of the first U-shaped section 24 and the second U-shaped section 26. Likewise, the rear beam portion 30 includes a second pair of side flanges 40 extending outwardly from the ends of the first side leg 34 and the second side leg 36. The second pair of side flanges 40 are crimped around the first pair of side flanges 38 to connect the front beam portion 28 to the rear beam portion 30. However, it is contemplated that the front beam portion 28 and the rear beam portion 30 could be connected in any manner. For example, the front beam portion 28 and the rear beam portion 30 could be mechanically fastened to each other, adhered to each other or welded to each other (either using the first pair of side flanges 38 and the second pair of side flanges 40 or by having the first side wall 20 and second side wall 22 of the front beam portion 28 overlap (under or over) the first side leg 34 and the second side leg 36 of the rear beam section portion 30 without any side flanges (see FIG. 2A)). As discussed in more detail below, the front beam section 28 and the rear beam section 30 as one continuous, integral section. The one piece continuous section could be manufactured in sheet material using the roll forming manufacturing process or could be made of aluminum using an extrusion processes.

As illustrated in FIG. 1, the front beam portion 28 of the beam 12 preferably includes tapered ends 42, thereby allowing the energy absorber 14 to have more depth at the corners of the bumper system 10 for better corner protection. Moreover, both the front beam portion 28 and the rear beam portion 30 preferably include a longitudinally extending channel 43 along the front face 18 and the base 32 thereof, respectively, for providing stability to the beam 12.

Preferably, the front beam portion 28 and the rear beam portion 30 are roll-formed and combined in-line. An example of a roll-forming process that can be used to form the front beam portion 28 and the rear beam portion 30 of the beam 12 is disclosed in U.S. Pat. No. 5,306,058, the entire contents of which are hereby incorporated herein by reference. The roll-forming process disclosed in U.S. Pat. No. 5,306,058 can be used with 16 rollers to form each of the front beam portion 28 and the rear beam portion 30 and four rollers to combine the front beam portion 28 and the rear beam portion 30.

In the illustrated example, the mounts 16 include brackets 44 connected to the rear beam portion 30 of the beam 12 at opposite ends of the beam 12. The brackets 44 are U-shaped and cover the base 32 and a portion of the first side leg 34 and the second side leg 36 of the rear beam portion 30. The brackets 44 can be connected to the rear beam portion 30 in any manner. For example, the brackets 44 can be mechanically fixed to the rear beam portion 30 using fasteners, adhered to the rear beam portion 30 or welded to the rear beam portion 30. An example of the brackets 44 and mounts 16 that can be used in the bumper system 10 is disclosed in U.S. Pat. No. 5,080,410, the entire contents of which are hereby incorporated herein by reference. However, it is contemplated that any mount can be used in the present invention and such mounts are well known to those skilled in the art.

Figure 2:
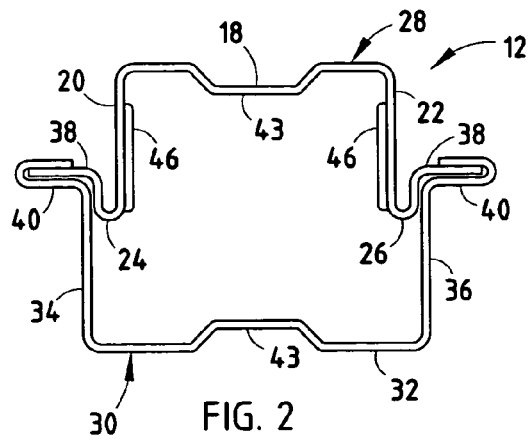
FIG. 2 is a cross-sectional view of the beam in accordance with the invention before an impact force is directed against a front face of the beam.
Figure 2A:
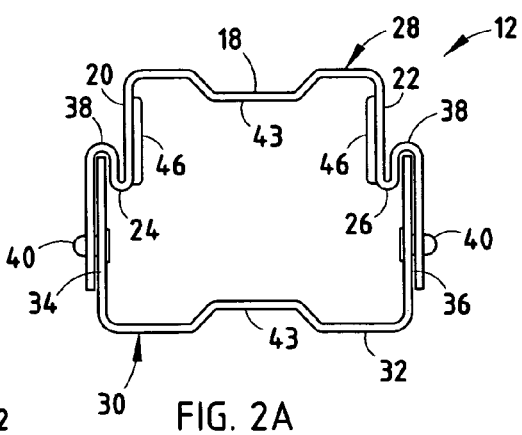
FIG. 2A is a cross-sectional view of an alternative beam in accordance with the invention before an impact force is directed against a front face of the beam.
Figure 3:
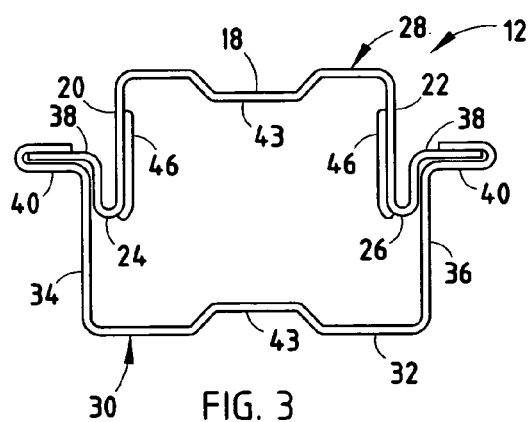
FIG. 3 is a cross-sectional view of the beam in accordance with the invention after an impact force is directed against a front face of the beam and in an intermediate position.
Figure 4:
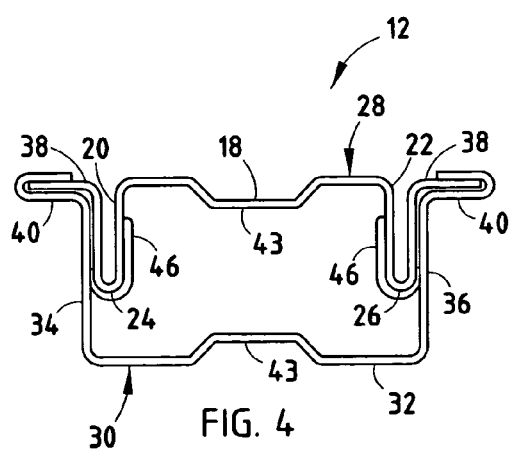
FIG. 4 is a cross-sectional view of the beam in accordance with the invention after an impact force is directed against a front face of the beam and in a final position.

The illustrated beam 12 includes the first side wall 20 that rolls to enlarge the first U-shaped section 24 and the second side wall 22 that rolls to enlarge the second U-shaped section 26 during the impact force directed against the front face 18 of the beam 12, thereby absorbing energy. FIG. 2 illustrates the beam 12 in an initial position before the impact force is directed against the front face 18 of the beam 12. However, when the impact force is directed against the front face 18 of the beam 12, the front wall 18 of the beam 28 will move towards the base 32 of the rear beam section 30. Preferably, the first side wall 20 and the second side wall 22 of the front beam portion 28 of the beam 12 include a plurality of ribs 46 to strengthen the first side wall 20 and the second side wall 22 to prevent buckling of the first side wall 20 and the second side wall 22 as the impact force is directed against the front face 18 of the beam 12. FIG. 3 illustrates the beam 12 in an intermediate position during the impact force directed against the front face 18 of the beam 12. In the intermediate position, the first U-shaped section 24 and the second U-shaped section 26 are larger than in the initial position. Furthermore, the ribs 46 have begun to roll about a bottom of the first U-shaped section 24 and the second U-shaped section 26. FIG. 4 illustrates the beam 12 in a final position as the impact force is directed against the front face 18 of the beam 12. In the final position, the first U-shaped section 24 and the second U-shaped section 26 are larger than in the intermediate position. Furthermore, the ribs 46 have fully rolled about the bottom of the first U-shaped section 24 and the second U-shaped section 26.

Figure 5:
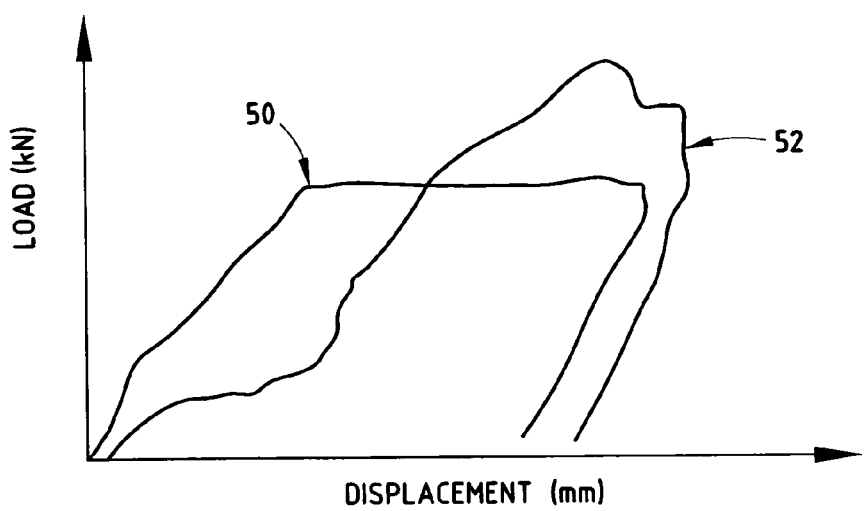
FIG. 5 is a load versus displacement graph of the beam in accordance with the present invention and a typical prior art beam.

FIG. 5 illustrates a load versus displacement graph with a first curve 50 representing data points measured using the beam 12 of the present invention and a second curve 52 representing data points measured using a typical prior art beam. The area under the first curve 50 for the beam 12 of the present invention and the second curve 52 of the typical prior art beam comprise the amount of energy absorbed by the beams. Efficiency associated with a beam system when represented graphically by a load versus displacement curve is defined as the area under the curve (absorbed energy) divided by the product of the highest attained load (i.e., the largest value of the curve on the ordinate of the graph) and the longest displacement (i.e., the largest value of the curve on the abscissa of the graph). A one hundred percent efficiency system would graphically resemble a square wave when plotting the load versus displacement curve for the system. As shown in the graph of FIG. 5, the square wave-like response of the first curve 50 for the beam 12 of the present invention is more efficient than the second curve 52 for the typical prior art beam.

Figure 6:
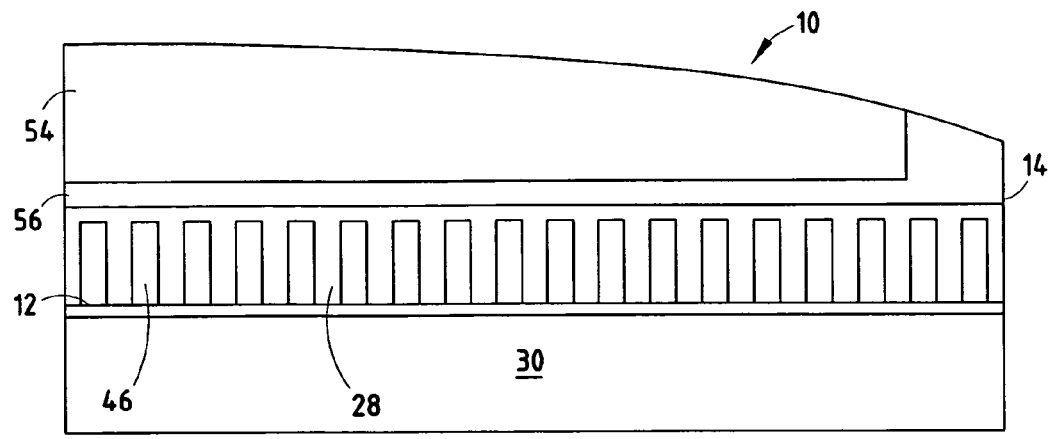
FIG. 6 is a top view of a first embodiment of the bumper assembly in accordance with the present invention.

The illustrated bumper system 10 can be manufactured from using various materials and using various thickness to improve the impact characteristics of the bumper assembly. FIG. 6 illustrates a first embodiment of the bumper system 10 of the present invention during impact. The energy absorber 14 has a front portion 54 being made of a crushable material and a rear portion 56 comprising a more rigid material. For example, the energy absorber 14 can be made of polyurethane, with the front portion 54 comprising hollow boxes and the rear portion 56 comprising a solid material reinforced with reinforcement ribs. The crushable material of the front portion 54 allows for more surface contact across an impact surface of the energy absorber 14 quickly during an impact against the front portion 54 of the energy absorber 14. As the surface contact across the impact surface of the energy absorber 14 increases, the force against the front face 18 of the front beam portion 28 will be more evenly distributed across the front beam portion 28, thereby causing more of the first U-shaped section 24 of the first side wall 20 and the second U-shaped section 26 of the second side wall 22 to roll and absorb energy. Furthermore, it is contemplated that the rear beam portion 30 of the beam 12 can be about 2.5 mm thick and have a tensile strength of about 80 ksi. Moreover, it is contemplated that the front beam portion 28 of beam 12a can be about 1.2 mm thick, have a tensile strength of about 35 ksi and include rectangular ribs 46. However, it is contemplated that many thicknesses and strengths of the beam can be employed in the energy management system 10.

Figure 7:
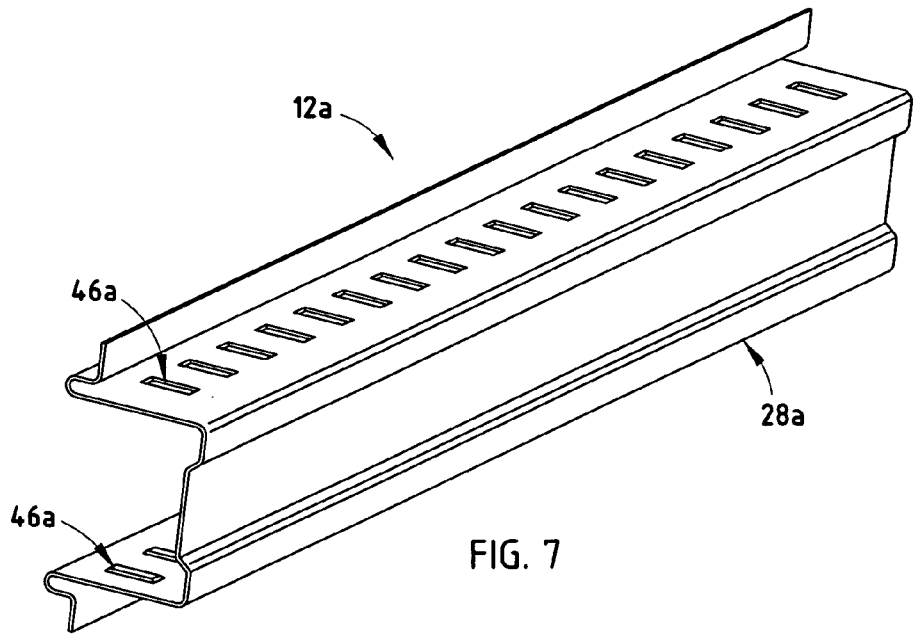
FIG. 7 is a perspective view of a front bumper portion of a second embodiment of the bumper assembly in accordance with the present invention.
Figure 8:
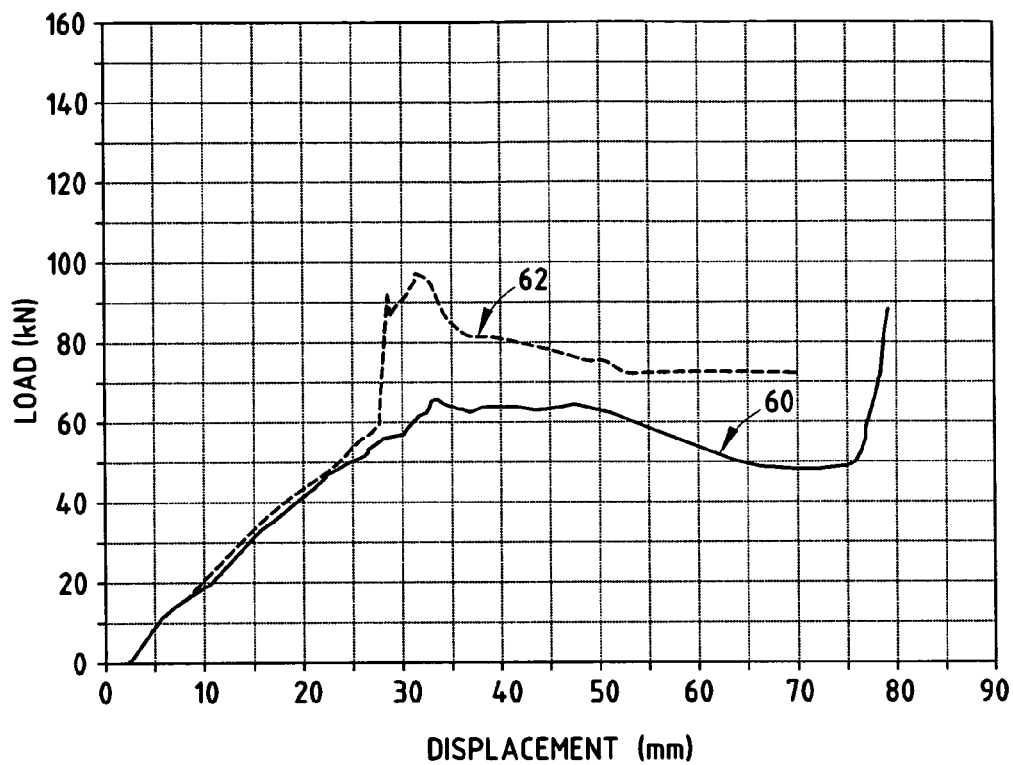
FIG. 8 is a load versus displacement graph for the front bumper portion of FIG. 6 and the front bumper portion of FIG. 7.

In the illustrated example, the first U-shaped section 24 and the second U-shaped section 26 can be changed to alter the performance of the energy management system 10. FIG. 7 illustrates a second embodiment of the beam 12a, with the first U-shaped section 24a and the second U-shaped section 26a having a smaller radius of curvature than the first U-shaped section 24 and the second U-shaped section 26 of the first embodiment of the beam 12. FIG. 8 illustrates a load versus displacement graph having a first curve 60 representing data points for measurements taken for the energy management system 10 of FIG. 6 with the first embodiment of the beam 12, wherein the first U-shaped section 24 and the second U-shaped section 26 each have a 4 t radius of curvature. FIG. 8 also illustrates a second curve 62 representing data points for measurements taken for the energy management system 10 with the second embodiment of the beam 12a of FIG. 7, wherein the first U-shaped section 24a and the second U-shaped section 26a each have a 2 t radius of curvature. FIG. 8 illustrates the load versus displacement graph for an impact of a vehicle of 3600 pounds traveling at a velocity of 5 miles per hour. Comparing the first curve 60 to the second curve 62, the second curve 62 for the beam 12a with the first U-shaped section 24a and the second U-shaped section 26a each having a 2 t radius of curvature has a more square response than the shape of the second curve 60 for the beam 12 having the first U-shaped section 24 and the second U-shaped section 26 with the 4 t radius of curvature. FIG. 8 therefore illustrates the flexibility of energy management system 10 to absorb energy depending on the design characteristics of the beam 12.

Figure 9:
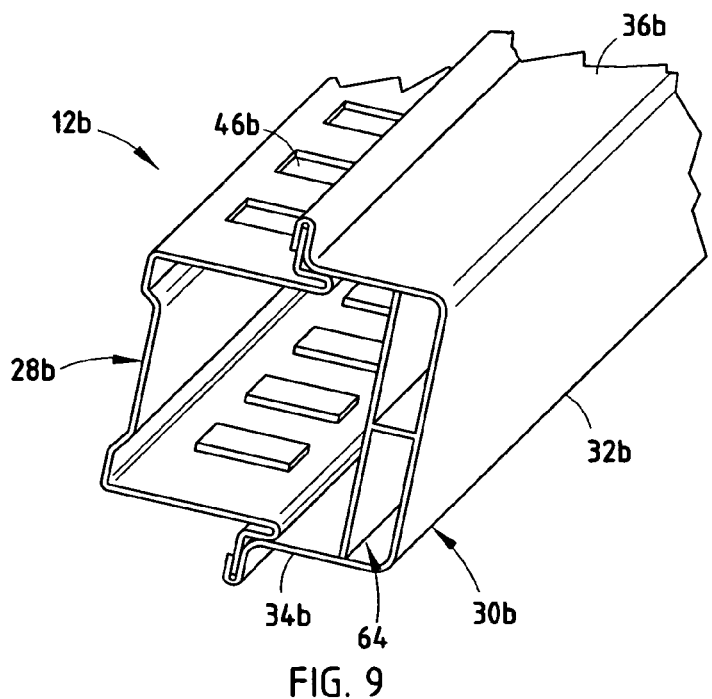
FIG. 9 is a partial cross-sectional perspective view of a bumper system of a third embodiment of the present invention.
Figure 10:
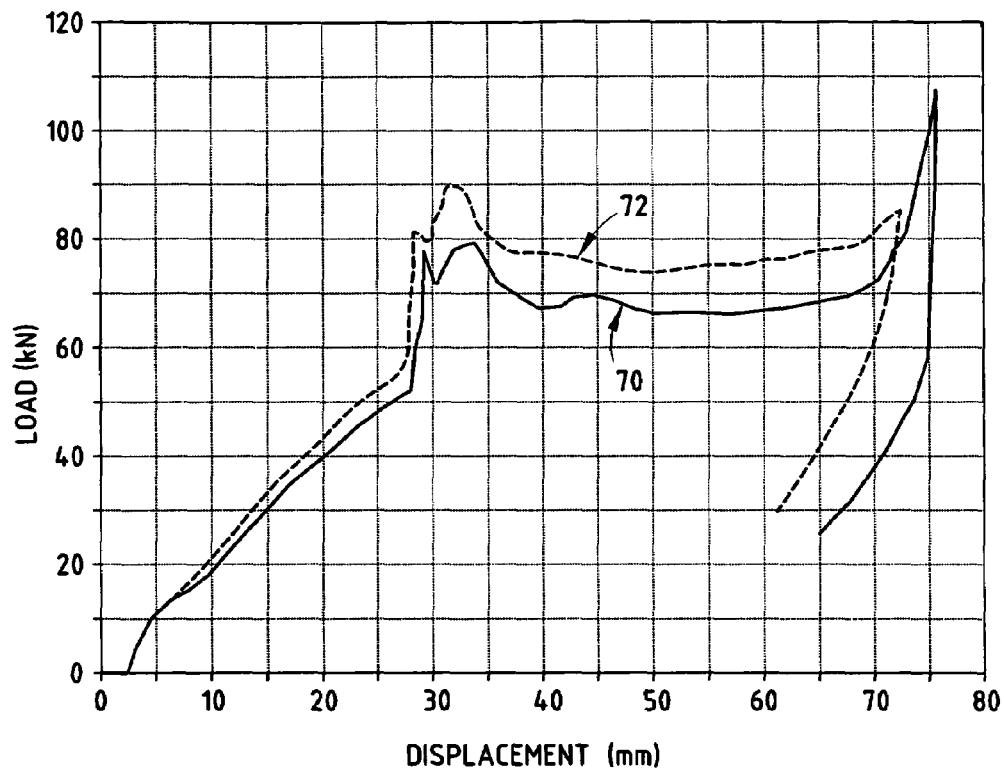
FIG. 10 is a load versus displacement graph for the bumper system of FIG. 9 having various thicknesses of aluminum.

FIG. 9 illustrates a third embodiment of the bumper system 10b of the present invention. The bumper system 10b includes a front beam portion 28b comprised of steel and a rear beam portion 30b comprised of aluminum. Furthermore, the rear beam portion 30b has a T-shaped support 64 extending between the first side leg 34b and the second side leg 36b and upward from the base 32b. Preferably, the rear beam portion 30b is made by extrusion. FIG. 10 illustrates the load versus displacement graph having a first curve 70 representing the data points for measurements taken for the beam 12b of FIG. 9, with the rear beam portion 30b of the beam 12b being about 3.0 mm thick and made from an aluminum of the 6000 series and the front beam portion 28b of beam 12b being about 1.2 mm thick, having a tensile strength of about 50 ksi and including thin ribs 46b. FIG. 10 also illustrates a second curve 72 representing the data points for measurements taken for the beam 12b of FIG. 9 with the thickness of the rear beam portion 30b increased to about 5 mm of thickness. Both the first curve 70 and the second curve 72 are for a vehicle mass of 3600 pounds traveling at a velocity of 5 miles per hour. The first curve 70 and the second curve 72 illustrate the flexibility in tuning the present invention by changing materials and material thicknesses.

Figure 11:
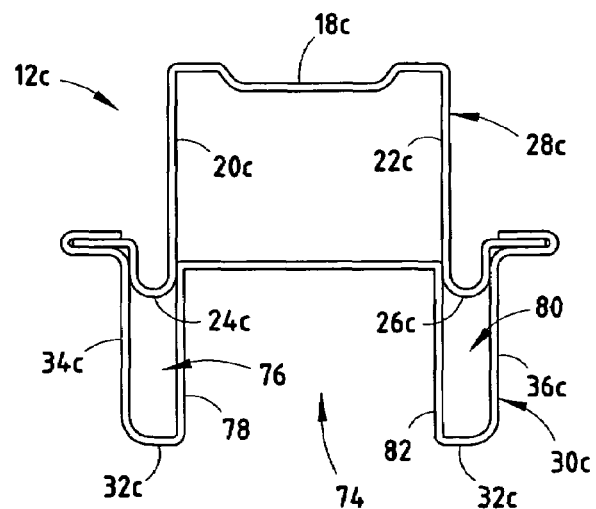
FIG. 11 is a cross-sectional view of a beam of a fourth embodiment of the present invention.

FIG. 11 illustrates a fourth embodiment of the bumper system 10c wherein the rear beam section 30c is "w" shaped. The base 32c of the rear beam section 30c includes a large groove 74 extending towards the front face 18c of the front beam portion 28c of the beam 12c. The rear beam section 30c therefore includes a first pocket 76 defined by a portion of the base 32c, the first leg 34c and a first side 78 of the groove 74 and a second pocket 80 defined by a portion of the base 32c, the second leg 36c and a second side 82 of the groove 74. The first pocket 76 and the second pocket 80 stiffen the rear beam section 30c. Furthermore, the first pocket 76 and the second pocket 80 are adapted to provide a guide to and support the first U-shaped section 24c of the first side wall 20c and second U-shaped section 26c of the second side wall 22c of the front beam portion 28c as they roll and enlarge during the impact force directed against the front face 18c of the beam 12c. It is contemplated that the beam 12c could be of a steel design, with the rear beam portion 30c having a thickness of about 2.5 mm and a tensile strength of about 80 ksi and the front beam portion 28c having a thickness of about 1.2 mm and a tensile strength of about 50 ksi. Alternatively, it is contemplated that the beam 12c could be of an 6000 series aluminum design, with the rear beam portion 30c having a thickness of about 4.0 mm and the front beam portion 28c having a thickness of about 1.2 mm. Although the beam 12c as illustrated in FIG. 11 does not include ribs 46, it is contemplated that the beam 12c could include ribs 46 of any size or shape. Furthermore, it is contemplated that the beam 12c could be made out of steel and aluminum.

Figure 12:
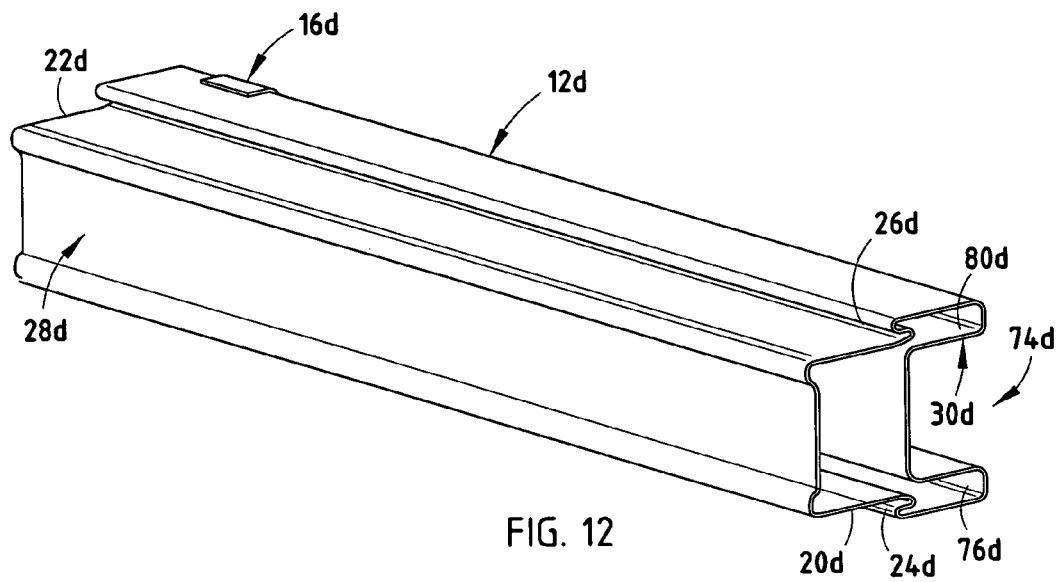
FIG. 12 is a perspective view of a one-piece beam of a fifth embodiment of the present invention.
Figure 13:
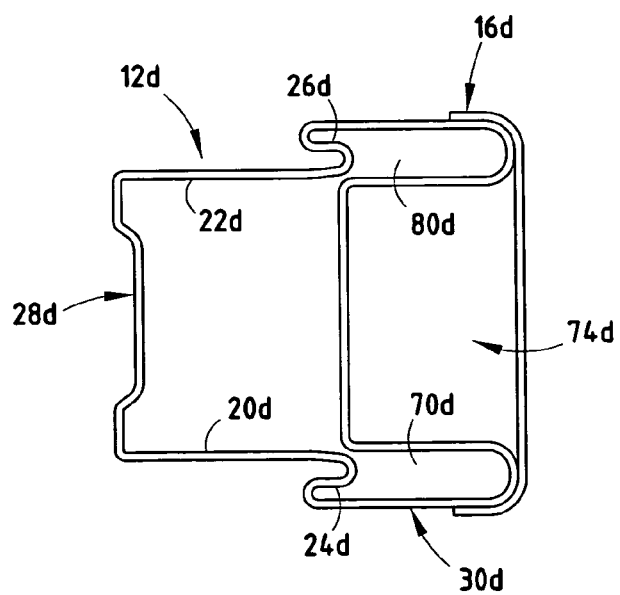
FIG. 13 is a cross-sectional view of the one-piece beam of the fifth embodiment of the present invention.
Figure 14:
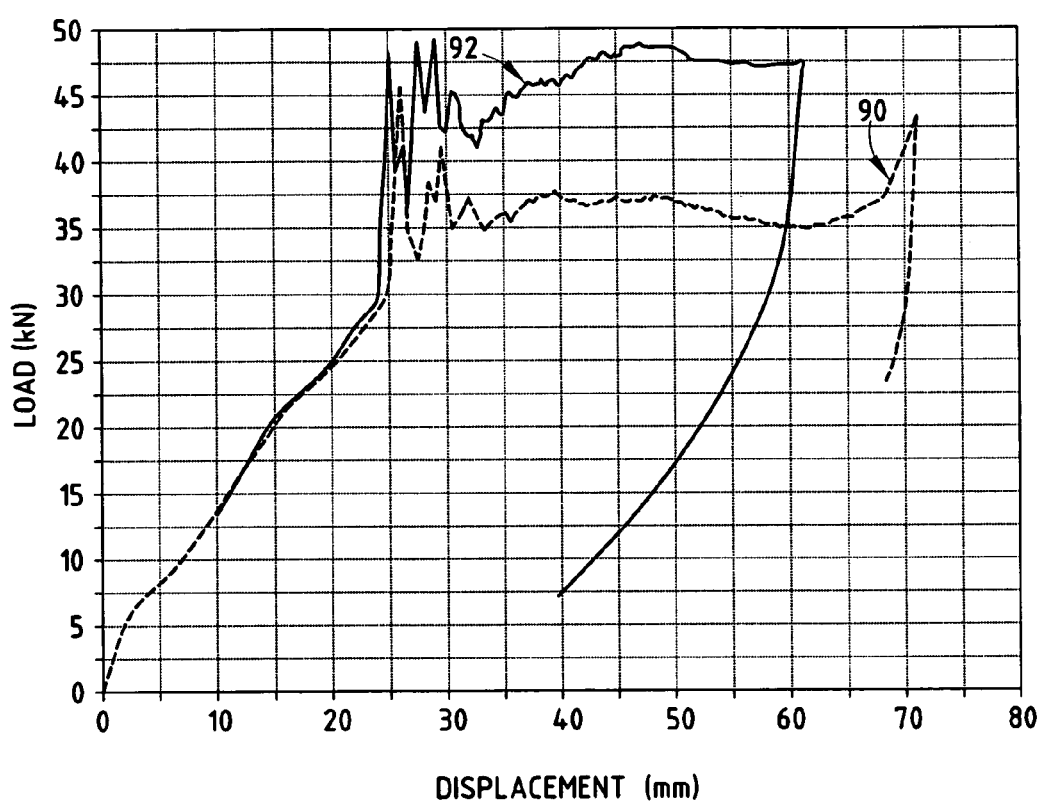
FIG. 14 is a load versus displacement graph for the bumper system of FIGS. 12-13 having various grades of aluminum.

FIGS. 12-13 illustrate a fifth embodiment of the bumper system 10d wherein the beam 12d is made out of a one-piece integral section. Preferably, the beam 12d is made from a 6000 series aluminum extrusion. The beam 12d includes an integral front beam portion 28d and rear beam portion 30d. Preferably, the rear beam portion 30e of the one-piece beam 12d includes the large groove 74d and the associated first pocket 76d and second pocket 80d. Furthermore, the first side wall 20d and the second side wall 22d preferably taper in a direction towards the first U-shaped section 24d and the second U-shaped section 26d, respectively, for stiffness and to prevent premature buckling of the beam 12d. Although the beam 12d as illustrated in FIGS. 12-13 does not include ribs 46, it is contemplated that a beam system similar to the beam 12d could be made from steel and would include ribs of any size. FIG. 14 illustrates the load versus displacement graph having a first curve 90 representing the data points for measurements taken for the beam 12d of FIGS. 12-13 using 6000 series aluminum at a T4 temper and a second curve 92 representing the data points for measurements taken for the beam 12d of FIGS. 12-13 using 6000 series aluminum at a T6 temper, both for a vehicle mass of 3600 pounds traveling at a velocity of 5 miles per hour. The first curve 90 and the second curve 92 illustrate that changes in performance can be attained with changes in materials.

Figure 15A:
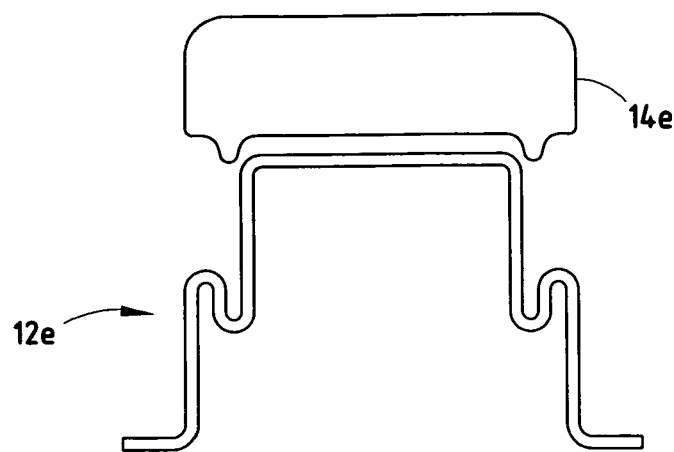
FIG. 15A-C are cross-sectional views of a beam without a rear beam section in the initial position, the intermediate position and the final position, respectively.
Figure 15B:
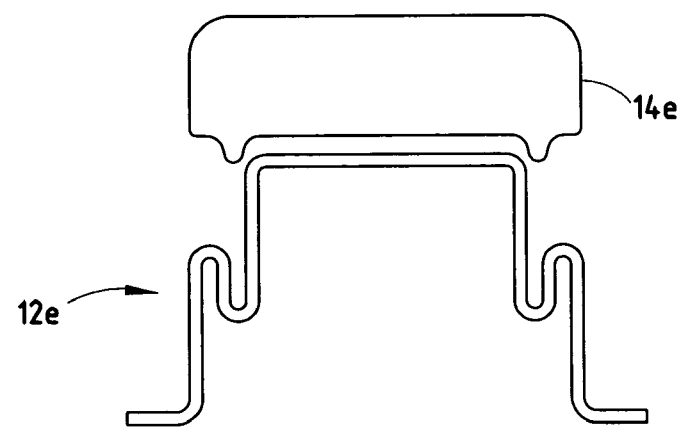
Figure 15C:
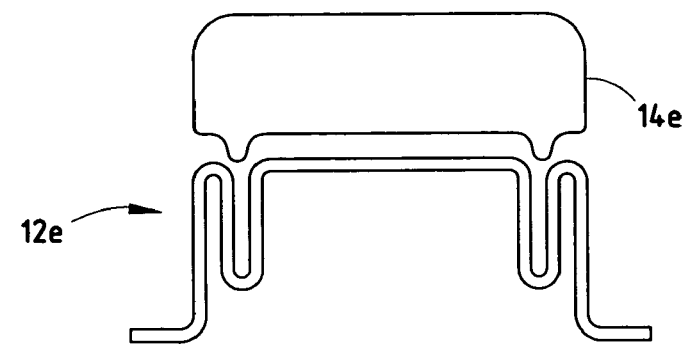
Figure 16:
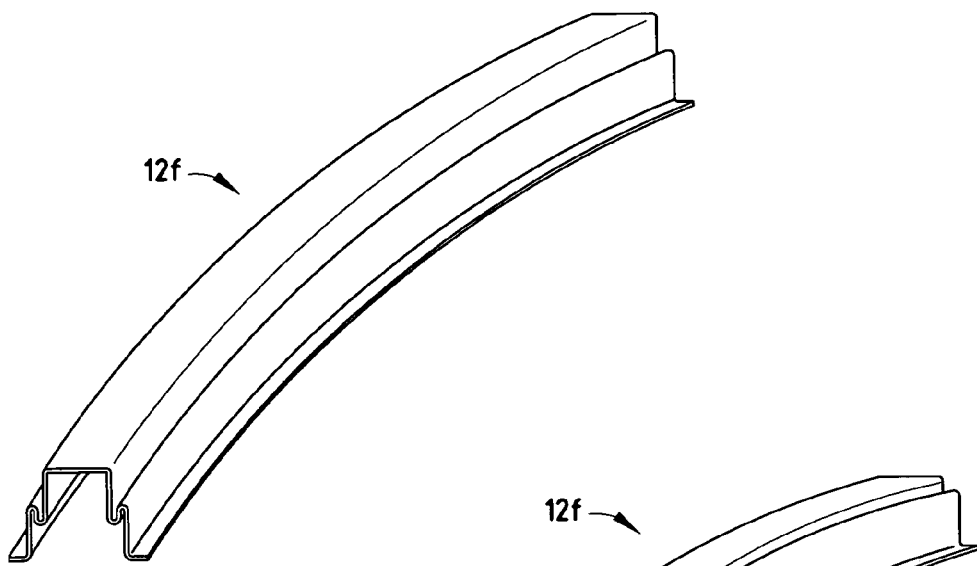
FIGS. 16-17 are perspective views of a swept beam according to the present invention.
Figure 17:
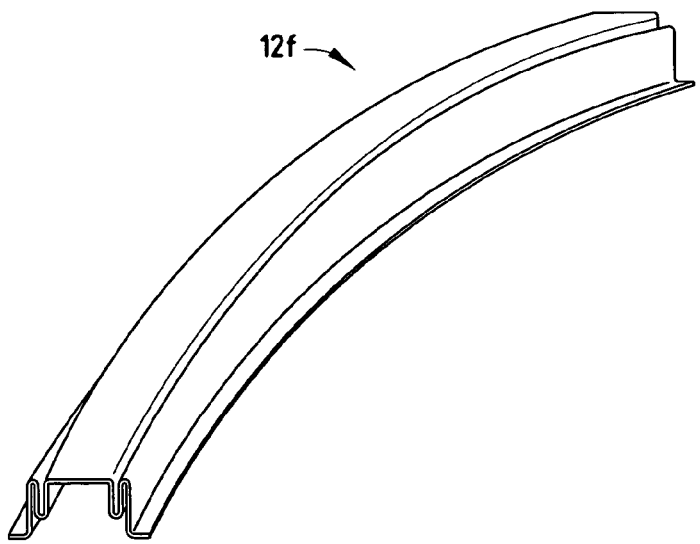
Figure 18:
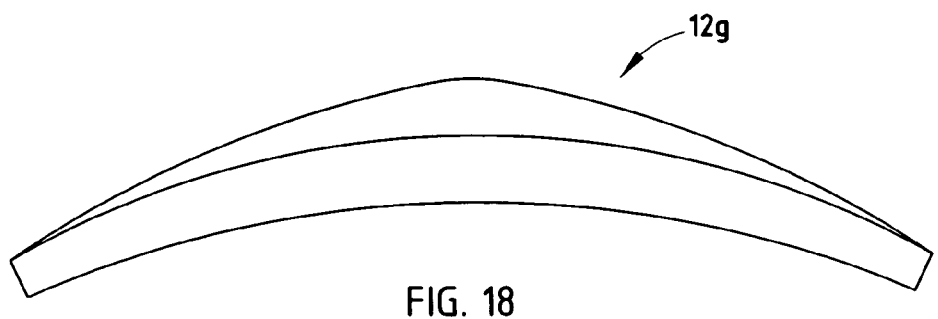
FIG. 18 is a top view of a beam of the present invention having a varying cross section.

It is to be understood that variations and modifications can be made on the aforementioned structure without departing from the concepts of the present invention, and further it is to be understood that such concepts are intended to be covered by the following claims unless these claims by their language expressly state otherwise. Modifications of this embodiment may well occur to those skilled in the art and to those who make or use the invention after learning the nature of this preferred embodiment, and the invention lends itself advantageously to such modification and alternative embodiments. For example, any of the embodiments of the beam could have ribs of any shape or size or could not have ribs. Furthermore, it is contemplated that the beam 12e does not require the rear beam section as illustrated in FIG. 15 (showing the initial position, the intermediate position and the final position of the beam 12f), the beam 12f could be swept as illustrated in FIGS. 16-17 or could have a varying cross section as illustrated in FIG. 18 (beam 12g) (either with the energy absorber and beam having a varying cross section or with portions of the first U-shaped section and the second U-shaped section of the beam being pre-rolled). Moreover, it is contemplated that the space between the front face of the front beam portion and the base of the rear beam portion can be empty or can have material with air pockets therein, thereby providing better energy absorption characteristics to the beam. Additionally, it is contemplated that the energy management system 10 could be reversed, with the rear beam portion (actually the front beam portion in this scenario) facing the impact force, wherein the first side wall rolls to enlarge the first U-shaped section and the second side wall rolls to enlarge the second U-shaped section during an impact force directed against the base of the rear beam portion (front beam portion in this scenario) of the beam. Therefore, it is to be understood that the embodiment shown in the drawings and described above is provided principally for illustrative purposes and should not be used to limit the scope of the invention.

We claim:

1. An energy management system comprising:
a longitudinally extending beam having a front face that extends in a longitudinal direction of the beam, a first side wall and a second side wall;
the first side wall having a first U-shaped section spaced from the front face; and
the second side wall having a second U-shaped section spaced from the front face;
wherein the first side wall rolls to enlarge the first U-shaped section and the second side wall rolls to enlarge the second U-shaped section during an impact force directed against the front face of the beam.

2. The energy management system of claim 1, further including:
an energy absorber located adjacent the front face of the beam.

3. The energy management system of claim 1, wherein:
the beam includes a front beam portion and a rear beam portion.

4. The energy management system of claim 3, wherein:
the front beam portion and the rear beam portion are integral.

5. The energy management system of claim 4, wherein:
the front beam portion and the rear beam portion have a uniform thickness.

6. The energy management system of claim 3, wherein:
the front face, the first side wall and the second side wall are on the front beam portion.

7. The energy management system of claim 3, wherein:
the front beam portion and the rear beam portion are mechanically connected.

8. The energy management system of claim 7, wherein:
a fastener mechanically connects the front beam portion to the rear beam portion.

9. The energy management system of claim 3, wherein:
the front beam portion and the rear beam portion are welded together.

10. The energy management system of claim 3, wherein:
a first one of the front beam portion and the rear beam portion includes a first pair of side flanges and a second one of the front beam portion and the rear beam portion includes a second pair of side flanges.

11. The energy management system of claim 10, wherein:
the second pair of side flanges are crimped over the first pair of side flanges to connect the front beam portion to the rear beam portion.

12. The energy management system of claim 10, wherein:
the first pair of side flanges and the second pair of side flanges are welded together.

13. The energy management system of claim 3, wherein:
the front beam portion is comprised of a first material and the rear beam portion is comprised of a second material; and
the first material is different than the second material.

14. The energy management system of claim 3, wherein:
the front face, the first side wall and the second side wall are on the front beam portion;
the rear beam portion includes a first side leg and a second side leg; and
the first side leg of the rear beam portion overlaps the first side wall of the front beam portion and the second side leg of the rear beam portion overlaps the second side wall of the front beam portion.

15. The energy management system of claim 1, wherein:
the first side wall and the second side wall each include a plurality of ribs to strengthen the first side wall and the second side wall to prevent buckling of the first side wall and the second side wall during the impact force directed against the front face of the beam.

16. The energy management system of claim 1, wherein:
the first U-shaped section and the second U-shaped section extend outwardly.

17. The energy management system of claim 1, wherein:
the first U-shaped section includes a first mouth opening in a direction substantially perpendicular to a longitudinal direction of the beam; and
the second U-shaped section includes a second mouth opening in the direction substantially perpendicular to the longitudinal direction of the beam.

18. The energy management system of claim 1, wherein:
the first U-shaped section includes a first mouth opening in a direction towards the front face of the beam; and
the second U-shaped section includes a second mouth opening in the direction towards the front face of the beam.

19. The energy management system of claim 1, wherein:
the first side wall and the second side wall are substantially parallel.
20. The energy management system of claim 1, wherein:
the first side wall and the second side wall extend laterally from the front face, the beam being longer in the longitudinal direction than in a lateral direction.
21. The energy management system of claim 1, wherein:
the first side wall and the second side wall are substantially parallel and the front wall extends between and covers an area between the first side wall and the second side wall.
22. The energy management system of claim 1, wherein:
the first side wall is spaced from and does not contact the second side wall.
23. An energy management system comprising:
longitudinally extending beam having a front face that extends in a longitudinal direction of the beam, a first side wall and a second side wall;
an energy absorber located adjacent the front face of the beam; and
mounts engaging a rear of the beam for connecting the beam to a vehicle;
the first side wall having a first U-shaped section spaced from the front face; and
the second side wall having a second U-shaped section spaced from the front face;
wherein the first side wall rolls to enlarge the first U-shaped section and the second side wall rolls to enlarge the second U-shaped section during an impact force directed against the front face of the beam.
24. The energy management system of claim 23, wherein:
the beam includes a front beam portion and a rear beam portion.
25. The energy management system of claim 24, wherein:
the front beam portion and the rear beam portion are integral.
26. The energy management system of claim 25, wherein:
the front beam portion and the rear beam portion have a uniform thickness.
27. The energy management system of claim 24, wherein:
the front face, the first side wall and the second side wall are on the front beam portion.
28. The energy management system of claim 24, wherein:
the front beam portion and the rear beam portion are mechanically connected.
29. The energy management system of claim 28, wherein:
a fastener mechanically connects the front beam portion to the rear beam portion.
30. The energy management system of claim 24, wherein:
the front beam portion and the rear beam portion are welded together.
31. The energy management system of claim 24, wherein:
a first one of the front beam portion and the rear beam portion includes a first pair of side flanges and a second one of the front beam portion and the rear beam portion includes a second pair of side flanges.
32. The energy management system of claim 31, wherein:
the second pair of side flanges are crimped over the first pair of side flanges to connect the front beam portion to the rear beam portion.
33. The energy management system of claim 31, wherein:
the first pair of side flanges and the second pair of side flanges are welded together.
34. The energy management system of claim 24, wherein:
the front beam portion is comprised of a first material and the rear beam portion is comprised of a second material; and
the first material is different than the second material.
35. The energy management system of claim 24, wherein:
the front face, the first side wall and the second side wall are on the front beam portion;
the rear beam portion includes a first side leg and a second side leg; and
the first side leg of the rear beam portion overlaps the first side wall of the front beam portion and the second side leg of the rear beam portion overlaps the second side wall of the front beam portion.
36. The energy management system of claim 23, wherein:
the first side wall and the second side wall each include a plurality of ribs to strengthen
the first side wall and the second side wall to prevent buckling of the first side wall and the second side wall during the impact force directed against the front face of the beam.
37. The energy management system of claim 23, wherein:
the first U-shaped section and the second U-shaped section extend outwardly.
38. The energy management system of claim 23, wherein:
the first U-shaped section includes a first mouth opening in a direction towards the front face of the beam; and
the second U-shaped section includes a second mouth opening in the direction towards the front face of the beam.
39. The energy management system of claim 23, wherein:
the first side wall and the second side wall are substantially parallel.
40. The energy management system of claim 23, wherein:
the first side wall and the second side wall extend laterally from the front face, the beam being longer in the longitudinal direction than in a lateral direction.
41. The energy management system of claim 23, wherein:
the first side wall and the second side wall are substantially parallel and the front wall extends between and covers an area between the first side wall and the second side wall.
42. The energy management system of claim 23, wherein:
the first side wall is spaced from and does not contact the second side wall.
43. An energy management system comprising:
a longitudinally extending beam including a first beam portion and a second beam portion, a first one of the first beam portion and the second beam portion having a first face that extends in a longitudinal direction of the beam, a first side wall and a second side wall, a second one of the first beam portion and the second beam portion having a second face; that extends in a longitudinal direction of the beam
the first side wall having a first U-shaped section spaced from the first face; and
the second side wall having a second U-shaped section spaced from the first face;
wherein the first side wall rolls to enlarge the first U-shaped section and the second side wall rolls to enlarge the second U-shaped section during an impact force directed against the first face of the first beam portion or the second face of the second beam portion.

44. The energy management system of claim 43, wherein:

the first one of the first beam portion and the second beam portion is the first beam portion;

the second one of the first beam portion and the second beam portion is the second beam portion; and the first side wall rolls to enlarge the first U-shaped section and the second side wall rolls to enlarge the second U-shaped section during an impact force directed against the first face of the first beam portion.

45. The energy management system of claim 44, further including:

an energy absorber located adjacent the front face of the first beam portion.

46. The energy management system of claim 43, wherein:

the first beam portion and the second beam portion are integral.

47. The energy management system of claim 43, wherein:

the first beam portion and the second beam portion have a uniform thickness.

48. The energy management system of claim 43, wherein:

the front face, the first side wall and the second side wall are on the first beam portion.

49. The energy management system of claim 43, wherein:

the first beam portion and the second beam portion are mechanically connected.

50. The energy management system of claim 49, wherein:

a fastener mechanically connects the first beam portion to the second beam portion.

51. The energy management system of claim 43, wherein:

the first beam portion and the second beam portion are welded together.

52. The energy management system of claim 43, wherein:

the first beam portion includes a first pair of side flanges and the second beam portion includes a second pair of side flanges.

53. The energy management system of claim 52, wherein:

the second pair of side flanges are crimped over the first pair of side flanges to connect the first beam portion to the second beam portion.

54. The energy management system of claim 52, wherein:

the first pair of side flanges and the second pair of side flanges are welded together.

55. The energy management system of claim 43, wherein:

the first beam portion is comprised of a first material and the second beam portion is comprised of a second material; and the first material is different than the second material.

56. The energy management system of claim 43, wherein:

the front face, the first side wall and the second side wall are on the first beam portion;

the second beam portion includes a first side leg and a second side leg; and the first side leg of the second beam portion overlaps the first side wall of the first beam portion and the second side leg of the second beam portion overlaps the second side wall of the first beam portion.

57. The energy management system of claim 43, wherein:

the first side wall and the second side wall each include a plurality of ribs to strengthen the first side wall and the second side wall to prevent buckling of the first side wall and the second side wall during the impact force directed against the first face of the first beam portion or the second face of the second beam portion.

58. The energy management system of claim 43, wherein:

the first U-shaped section and the second U-shaped section extend outwardly.

59. The energy management system of claim 43, wherein:

the first U-shaped section includes a first mouth opening in a direction towards the first face of the beam; and the second U-shaped section includes a second mouth opening in the direction towards the first face of the beam.

60. The energy management system of claim 43, wherein:

the first side wall and the second side wall are substantially parallel.

61. The energy management system of claim 43, wherein:

the first side wall and the second side wall extend laterally from the front face, the beam being longer in the longitudinal direction than in a lateral direction.

62. The energy management system of claim 43, wherein:

the first side wall and the second side wall are substantially parallel and the front wall extends between and covers an area between the first side wall and the second side wall.

63. The energy management system of claim 43, wherein:
the first side wall is spaced from and does not contact the second side wall.

* * * * *

UNITED STATES PATENT AND TRADEMARK OFFICE
CERTIFICATE OF CORRECTION

PATENT NO. : 7,407,219 B2
APPLICATION NO. : 10/808127
DATED : August 5, 2008
INVENTOR(S) : Scott C. Glasgow et al.

It is certified that error appears in the above-identified patent and that said Letters Patent is hereby corrected as shown below:

Column 10, claim 43, lines 57-58, delete "that extends in a longitudinal direction of the beam"

Column 10, claim 43, line 60, after "face" insert --that extends in a longitudinal direction of the beam--

Signed and Sealed this

Sixteenth Day of December, 2008

JON W. DUDAS
*Director of the United States Patent and Trademark Office*